March 18, 1941.  F. H. SHEPARD, JR  2,235,173
CIRCUIT TESTER
Filed June 18, 1938
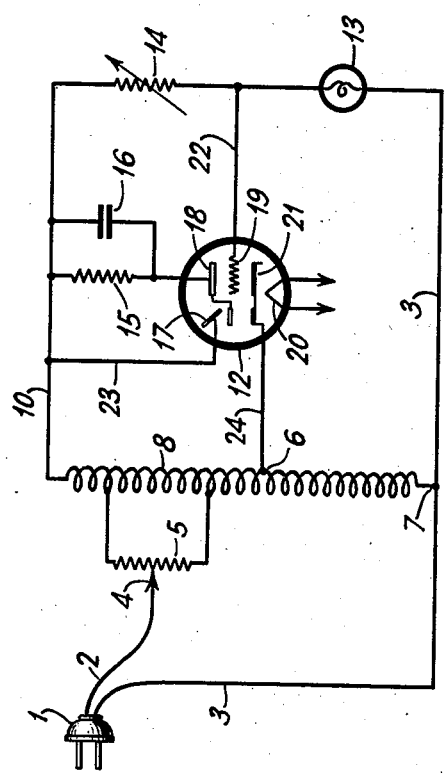
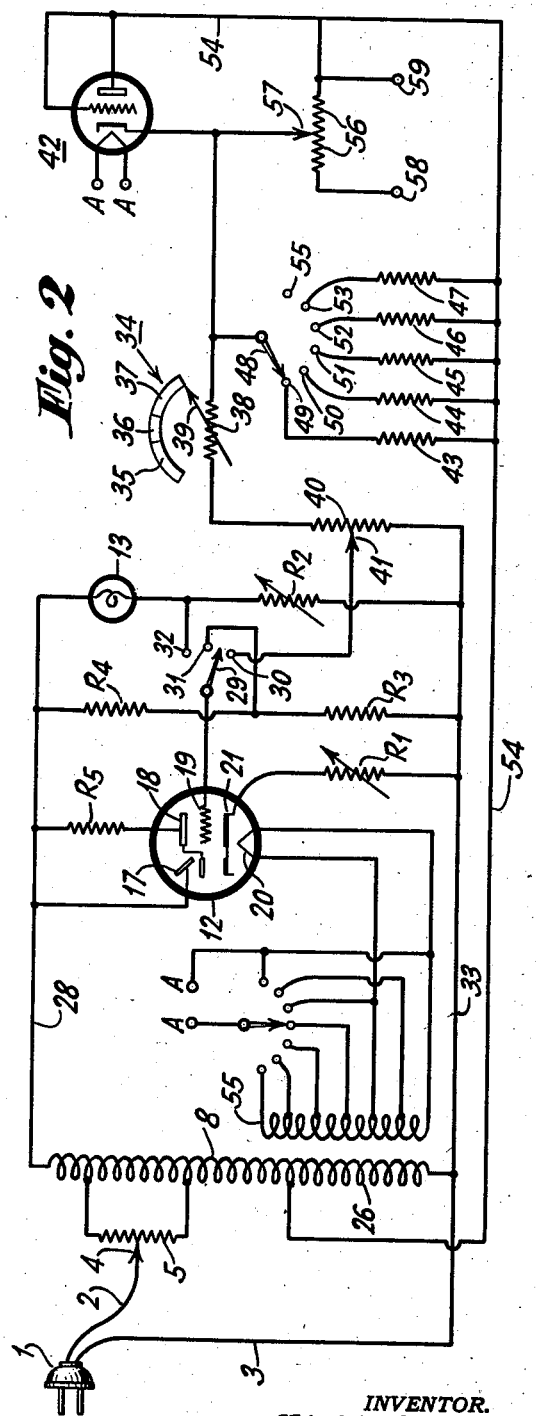
INVENTOR.
FRANCIS H. SHEPARD, JR.
BY
ATTORNEY.

Patented Mar. 18, 1941

2,235,173

UNITED STATES PATENT OFFICE 2,235,173

CIRCUIT TESTER

Francis H. Shepard, Jr., Rutherford, N. J., assignor to Radio Corporation of America, a corporation of Delaware Application June 18, 1938, Serial No. 214,459

3 Claims. (Cl. 175—183)

The present invention relates to an arrangement for testing circuits and tubes.

It is an object of the invention to devise a tester which is very easily constructed at minimum expense and very reliable. The tester incorporates a so-called "Magic eye" tube both as the indicating device and as a standard determining means.

The invention will be better understood by reference to the drawing wherein Fig. 1 illustrates a circuit arrangement used to provide a standard voltage; and Fig. 2 illustrates a tube tester and a line voltage checker constructed in accordance with the invention.

It is, of course, apparent that in a testing device a standard must be provided in order that comparative tests may be made. In the usual tube tester the voltage which is applied to the testing circuits for making the tests should be a certain predetermined value, otherwise the results of tests would not be interpreted accurately. Consequently, in the ordinary tube tester there is usually provided a voltmeter for measuring the voltage applied to the testing circuit and an adjustable means to vary the applied voltage so as to bring it to the standard desired.

In the present invention, a magic eye tube is used in place of the voltmeter to indicate the applied voltage. The usual tube tester also incorporates a meter for measuring the emission of a tube under test to give an indication of its worth. According to this invention that meter is also done away with and the same magic eye tube provides the indication.

Referring to Fig. 1, a plug 1 connects the testing circuit to a source of alternating voltage, usually the available commercial power supply network; 2 and 3 are conductors leading from the plug 1, to an autotransformer 8, a section of which is shunted by a resistor 5 which is provided with a slider 4 for adjustment purposes. It should be noted that the conductor 2 is connected to the slider 4 and that conductor 3 is connected to one end 7 of the winding 8. The space path of a tube 12, which is preferably a magic eye type tube such as an RCA 6E5 electron ray tube is connected across a portion of transformer 8 through conductors 10 and 24. This tube may be a high vacuum heater cathode type of tube designed to indicate visually by means of a fluorescent target the effects of a change in the controlling voltage. The tube is essentially a voltage indicator. The elements of the tube comprise a heater 20, a cathode 21, a grid 19, an anode 18 and a target anode 17, all of which are enclosed within the envelope 12. The target 17 is connected to the conductor 10 directly while anode 18 is connected to conductor 10 through a resistor 15 shunted by a condenser 16. Since the cathode 21 is connected to the conductor 24 the space path of the tube is, in effect, across the part of the transformer 8 between conductors 10 and 24. The heater circuit 20 is connected in any suitable manner to a proper source of voltage in the usual manner. In the device of Fig. 1 the conductor 10 is connected to the conductor 3 through a variable linear resistor 14 in series with a non-linear resistor which may comprise an incandescent lamp 13. The common point between resistor 14 and lamp 13 is connected to the grid 19 through the conductor 22. Since grid 19 is connected to conductor 3 through conductor 22 and lamp 13, a control voltage is developed from the grid 19 of tube 12 to the cathode 21 thereof which due to the non-linearity of lamp 13 depends upon the line voltage. Thus, the closing of the "eye" of tube 12 may be a measure of the line voltage and can be used to set the voltage at some predetermined constant value by manipulating the slider 4 along resistor 5 until the eye closes a certain predetermined amount.

Tests have shown that by the method herein disclosed the line voltage can be set within a small percentage of the desired value if one always adjusts to the same degree of closure of the eye by manipulation of slider 4.

In the tube tester circuit shown in Fig. 2 the electric eye tube is shown at 12 and the tube under test is shown at 42, a plug 1 connects the testing circuit to a commercially available power supply network. In this case a combination transformer having a winding 8 and a winding 55 is effectively connected to the plug 1 by means of the conductors 2 and 3. A portion of the winding 8 is shunted by a resistor 5 which is provided with a slider 4 connected to the conductor 2. A four-arm bridge circuit comprising resistors $R_2$, $R_3$ and $R_4$ and lamp 13 is connected so that the winding 8 is connected through the conductors 28 and 33 between a point of the bridge common to $R_4$ and 13 and a point thereof common to $R_2$ and $R_3$. The electric eye tube is provided with a heater circuit 20 which is connected across a portion of secondary winding 55, a cathode 21 connected to the conductor 33 through a variable resistor $R_1$, a grid 19 connected to the movable arm of a multi-position switch 29, an anode which is connected to conductor 28 through a resistor $R_5$ and the target anode 17 which is connected directly to the conductor 28. Movable switch arm 29 may be connected to any one of contact points 30, 31 and 32. The contact point 32 is connected to a point of the bridge circuit which is intermediate the lamp 13 and the resistor $R_2$. The point 31 is connected to a point of the bridge circuit which is intermediate the resistors $R_3$ and $R_4$.

For testing purposes a tube such as 42 is inserted in its proper socket which in the case shown connects the grid and anode of the tube together by means of a conductor 54 which also connects the grid and anode to an intermediate point of the transformer winding 8. Another point of the transformer winding 8 is connected by means of the conductor 33, resistor 40 and resistor 38 to the cathode of the tube 42. In this way the tube under test is connected as a rectifier since the grid and anode are tied together across portion 26 of the winding 8 so that the voltage developed across the portion 26 of the winding is impressed between the anode and cathode of the tube 42 and thereby rectified. Terminals A, A of the heater circuit of the tube under test are connected to the terminals A, A associated with secondary 55. Various taps are provided on the secondary 55 so that the proper voltage may be applied to the heater circuit for different tubes under test. The variable resistor 38 is provided with the movable arm or indicator 39 which cooperates with a scale 34 arranged to indicate the adjustment of the resistor 38. The scale 34 is preferably marked with 3 different markings 35, 36 and 37 which indicate respectively that a tube is good, fair or bad. A slider 41 is provided on the resistor 40 and this slider is connected to the terminal 30 of the multi-position switch previously mentioned. In order that a single scale which indicates directly the worth of the tube under test may be employed, shunt resistors 43 through 47 are provided. Any one of these resistors may be shunted across series resistors 38 and 40 by operating the movable arm 48 of a multi-position switch, the arm 48 cooperating with the contacts 49 through 53 for this purpose. It is also necessary to set arm or slider 41 at the proper point along resistor 40 for any particular type of tube under test as will be explained hereinafter. In the bridge circuit the resistors $R_2$, $R_3$ and $R_4$ have linear characteristics with effective voltage while the lamp 13 changes its resistance with applied voltage. As a consequence it can be seen that there will be ony one voltage that can be applied to the bridge that will cause the bridge to balance.

In the operation of the arrangement shown in Figure 2 the tube 12 which may be an RCA 6E5 type tube is used to check, that is, to determine whether the voltages across the two arms of the bridge are zero. To determine this the procedure is as follows: Arm 29 is placed in a position to contact point 31. Then the resistor $R_1$ is adjusted until the tube 12 snaps. Then the arm 29 is moved to position 32 and the slider 4 is adjusted along the resistor 5 until the tube 12 snaps. Then the arm 29 is again put in the position to contact point 31 and $R_1$ readjusted until the eye snaps. Movable arm 29 is then placed in position 32 again and the line adjustment is again made until the tube 12 snaps by moving the slider 4. This procedure is repeated until the adjustment is such that the tube 12 is on the trigger point with the switch arm 29 in either positions 31 or 32. When the proper adjustment is made the tube may be tested by switching the arm 29 so as to contact point 30 which impresses the voltage across a portion of the resistor 40 between grid 19 and cathode 21 of the tube 12. The slider 41 which cooperates with the resistor 40 is provided with a suitable scale graduated with RMA numbers which are standard in tube testers and its position along resistor 40 is determined by the type tube under test. The arm 48 is operated so as to place the proper shunt across the series resistors 40 and 38.

The value of resistors 43 through 47 are also determined by RMA standards for the various tubes to be tested. Assuming now that a tube such as 42 is being tested the arm 41 is placed to the proper point on the resistor 40. Arm 48 is operated to shunt the proper resistor and then the adjustable element 39 of the resistor 38 is operated until the tube 12 snaps. If the tube snaps while the pointer 39 is anywhere within the range 35 of the dial 34 then the tube is considered a good one. If the tube should snap anywhere within the range 36 of the dial 34 the tube is fair, but if the element 39 has to be moved so as to be anywhere within the range 37 of dial 34 before the tube snaps then the tube is a poor one.

It is, of course, obvious that the circuit shown may be amplified or extended so as to be capable of testing substantially any type tube by simply providing the necessary shunt resistors and heater circuit taps.

As previously inferred the circuit arrangement described herein may also be used as a circuit checker of the type used, for instance, by radio repair men. In such a case the arm 48 of the multi-position switch is operated so as to contact with the auxiliary blank contact point 55. Provision is made for connecting armature 48 of the switch to the sliding contact 57 arranged to slide along a resistor 56, one end of which is connected both to the conductor 54 and to the terminal 59. The other end of the resistor 56 is connected to the terminal 58. Terminals 58 and 59 are used to connect any piece of apparatus which it is desired to test.

From the preceding description it can be seen that the action of the device shown in Figure 2 is to actually measure currents through the shunts 43 through 47. The position of the slider 41 and the adjustment of resistor 38 to cause the eye to snap indicates the voltage across and hence the current through the shunts. When the switch 48 is moved to the contact position 55 and a suitable divider 56 is connected across an input voltage fed between terminals 58 and 59 the position of the slider 41 and the adjustment of resistor 38 will indicate the voltage across the portion of resistor 56 which is between the slider 57 and terminal 59. If the position of slider 57 on divider 56 is known the voltage between points 58 and 59 will be known. Inasmuch as tube 12 is sensitive to an input voltage only during the most positive part of the power cycle the testing arrangement will indicate the peak voltage that occurs during this part of the cycle. This means that the device will measure 60 cycle A. C. voltages in phase with the power supply. Also, D. C. voltages and A. C. voltages having a frequency relatively high with respect to the power supply frequency but low with respect to the frequency response of the magic eye circuit as limited by the capacitances of the plate 18 and its conductor which effectively shunts resistor $R_5$.

It is obvious that the present invention may be embodied in various other arrangements without in any way departing from the spirit of the invention as defined in the appended claims.

I claim:

1. In voltage indicating and adjusting apparatus a closed circuit including a transformer winding, an ohmic resistor and a non-linear resistor in series, means including a voltage adjusting device for connecting said winding to a source of voltage, voltage indicating means comprising an electron ray tube having an anode, a cathode, a control electrode and a target anode, means connecting said cathode to a point of said winding, means for connecting the control electrode to a point of said circuit intermediate the ohmic resistor and the non-linear resistor and means for connecting the anode and the target anode to a point of said circuit which is intermediate the ohmic resistor and said winding, the connection of the anode to said last named point including a resistor device.

2. Voltage indicating and adjusting apparatus including an electron ray tube having an anode, a cathode, a control electrode and a target anode, means including a pair of conductors and an adjustable voltage determining means for connecting said device to an electrical power supply line, said control electrode being connected respectively to each of said conductors, to one through a linear resistor and to the other through a non-linear resistor, a transformer winding means including a load resistor and a portion of said transformer winding for connecting the anode of said tube to one of said conductors, means including said portion of said transformer winding for connecting the target anode to said last named conductor and means including an impedance for connecting the cathode to the other of said conductors, whereby the space path of said tube is, in effect, connected across said two conductors.

3. In a device of the kind described, an electron ray tube having an anode, a cathode, a control electrode and a target anode, a pair of conductors adapted to be connected across an alternating current power supply line, a transformer winding, a variable path associated with said transformer winding and connected to one of said conductors, the other of said conductors being connected to one end of the transformer winding, a series circuit including said transformer winding, a non-linear resistor and an ohmic resistor in series, a connection between the target anode and a point of said series circuit intermediate the transformer winding and the non-linear resistor, means including a resistor element for connecting the anode of said tube to said same point, a resistor connected between the cathode of said tube and a point of the series circuit intermediate the ohmic resistor and the transformer winding, a switch including a movable arm and three contact points, said movable arm being connected to the control electrode, means for connecting one of said contact points to a point of the series circuit intermediate the non-linear resistor and the ohmic resistor, a circuit comprising a pair of resistors in series connected across said transformer winding, means for connecting one of said other switch contact points to a point which is common to the last two named resistors, a pair of terminals, means including an indicator resistor device and an auxiliary resistor in series connected between said one of said last named terminals and one end of said transformer winding, and means connecting an intermediate of the transformer winding to the other of said two terminals, a variable tap for said auxiliary resistor and means for connecting the third of said contact points to said variable tap.

FRANCIS H. SHEPARD, Jr.